United States Patent
Beecher et al.

(10) Patent No.: US 10,906,466 B2
(45) Date of Patent: Feb. 2, 2021

(54) REAR VIEW DEVICE WITH DETENT SYSTEM

(71) Applicant: MOTHERSON INNOVATIONS COMPANY LIMITED, London (GB)

(72) Inventors: Stephen Beecher, Portchester (GB); Kurti Levente, Portchester (GB); Gareth Aspden, Portchester (GB); Dong Myeong Park, Portchester (GB); David Kershaw, Portchester (GB); Tom Harris, Portchester (GB)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 0 days.

(21) Appl. No.: 16/523,579

(22) Filed: Jul. 26, 2019

(65) Prior Publication Data

US 2020/0031285 A1    Jan. 30, 2020

(30) Foreign Application Priority Data

Jul. 27, 2018    (DE) .......................... 10 2018 118 268

(51) Int. Cl.
*B60R 1/06* (2006.01)
*F16C 11/10* (2006.01)
*B60R 1/076* (2006.01)

(52) U.S. Cl.
CPC ............... *B60R 1/06* (2013.01); *B60R 1/076* (2013.01); *F16C 11/103* (2013.01)

(58) Field of Classification Search
CPC . B60R 1/06; B60R 1/074; B60R 1/076; F16C 11/103; G05G 5/02; G05G 5/05; G05G 5/06
See application file for complete search history.

(56) References Cited

U.S. PATENT DOCUMENTS

| | | | | | |
|---|---|---|---|---|---|
| 4,789,232 | A * | 12/1988 | Urbanek | ................ | B60R 1/076 248/475.1 |
| 6,022,113 | A * | 2/2000 | Stolpe | .................... | B60R 1/074 248/479 |
| 6,742,756 | B1 * | 6/2004 | Fimeri | ................... | B60R 1/074 248/479 |
| 7,448,762 | B2 * | 11/2008 | Su | .......................... | B60R 1/076 248/478 |
| 7,452,088 | B2 * | 11/2008 | Brester | .................. | B60R 1/076 248/478 |

(Continued)

FOREIGN PATENT DOCUMENTS

| DE | 102013204551 A1 | 9/2014 |
|---|---|---|
| WO | WO 91/04172 A1 | 4/1991 |
| WO | WO 2005/110812 A1 | 11/2005 |

OTHER PUBLICATIONS

Machine translation of WO 2005110812 A1 obtained on Feb. 19, 2020.*

(Continued)

*Primary Examiner* — Adam D Rogers
(74) *Attorney, Agent, or Firm* — Jones Day (57) ABSTRACT

A rear view device for a vehicle includes a casing which is configured to rotate with respect to a base with a centre shaft and received by the casing, and a detent system which is configured to control rotation of the casing with respect to the base with centre shaft, the detent system including a spring.

17 Claims, 6 Drawing Sheets

(56) References Cited

U.S. PATENT DOCUMENTS

| | | | |
|---|---|---|---|
| 7,490,945 B2* | 2/2009 | Proctor | B60R 1/076 359/841 |
| 8,123,369 B2* | 2/2012 | Itoh | B60R 1/076 359/841 |
| 8,998,431 B2* | 4/2015 | Tseng | G02B 7/182 359/877 |
| 9,033,526 B2* | 5/2015 | Schuurmans | B60R 1/076 359/841 |
| 9,555,741 B2* | 1/2017 | Di Giusto | B60R 1/076 |
| 9,630,559 B2* | 4/2017 | Umino | B60R 1/074 |
| 10,391,941 B2* | 8/2019 | Yoshida | B60R 1/074 |
| 10,513,223 B2* | 12/2019 | Umino | B60R 1/076 |
| 2004/0261411 A1 | 12/2004 | MacGregor | |
| 2009/0147388 A1* | 6/2009 | Mendoza | B60R 1/076 359/871 |
| 2018/0178728 A1* | 6/2018 | Wan | B60R 1/07 |
| 2018/0281682 A1* | 10/2018 | Ichikawa | B60R 1/074 |
| 2019/0092241 A1* | 3/2019 | Fujisaki | B60R 1/074 |
| 2019/0118714 A1* | 4/2019 | Fujisaki | F16C 33/102 |

OTHER PUBLICATIONS

German Office Action dated Jan. 31, 2019 of the priority application DE 10 2018 118 268.6.

\* cited by examiner

REAR VIEW DEVICE WITH DETENT SYSTEM

CROSS-REFERENCE TO RELATED APPLICATION

This application claims the benefit of foreign priority to German Patent Application No. 10 2018 118 268.6, filed Jul. 27, 2018, which is hereby incorporated by reference in its entirety for all purposes.

TECHNICAL FIELD

The following description relates to a rear view device with a detent system for controlling the rotation of the rear view device. For example, the detent system of the rear view device may include a spring which activates or deactivates the detent system.

BACKGROUND OF THE INVENTION

Motor vehicles typically have two external rear view assemblies. Such assemblies typically have a head that is designed to rotate about a substantially vertical pivot axis in both forward and rearward directions. The head is typically held in its driving or deployed position by a detent which allows manual movement of the head to a parked position and manual movement to a forward position. There are a number of reasons for this. One reason is safety. By having a rear view head that can "break away" to move from a deployed position to a parked or forward position, injury to people can be avoided or at least minimized. Furthermore, damage to the rear view head can be avoided or at least minimized by allowing it to move when it hits obstructions. It is also useful to have a rear view head that can be parked, that is rotated to a position substantially parallel to the side of the vehicle, so as to narrow the effective width of the vehicle. This is particularly useful when the vehicle is parked. It is also useful for loading vehicles onto trucks for transport to be able to park the rear view heads.

Modern external rear view devices, in addition to having a detent mechanism to hold the head in a deployed position while at the same time enabling forward folding and rearward folding of the head, also have electric drive systems to allow the operator to drive the head at least to its parked position. Some external rear view assemblies have more sophisticated electric systems that allow the operator to redeploy the head to a deployed position after it has been manually pushed forward or rearward. These systems are typically referred to as powerfold systems.

Powerfold systems typically employ powerfold mechanisms that include springs to hold detents in place such that a predetermined force is required to manually break the mirror head out of the detent. A problem with many powerfold mechanisms is that they require a high torque drive system, such as a DC motor, to overcome the initial force required for an initial detent tooth, and a high level of noise is generated as a result of operating the high torque drive system.

U.S. Pat. No. 6,022,113 to Stolpe et al. describes a rear view mirror for a vehicle that can be pivoted both manually and electrically. A clutch between the mirror head and the base, in the form of latching cams on a base and recesses within a gear wheel, is described that allows the mirror head to be manually pivoted. Two drive stops are formed as an integral part of the housing. The drive stops are sloping faces on the housing that contact raised features on the base. The drive stops cannot be used to reset the clutch at the drive position after a manual fold. Instead the mirror head must be electrically driven against an end stop or fold path limiter so as to create the required reaction torque and rotation to reset the clutch.

U.S. Pat. No. 9,033,526 to Schuurmans et al. describes a powerfold mechanism for an external rear view mirror. The mechanism includes a powerfold housing mountable between a mirror housing and a vehicle mountable mirror base, a clutch member urged into engagement with the mirror, the clutch member allowing the mirror housing to be manually moved with respect to the mirror base, an electric drive train between the powerfold housing and the clutch member, and a drive stop movably mounted to the powerfold housing and having a drive stop face engagable with a drive stop detent mounted to the mirror base The above discussion of background is included to explain the context of the present invention. It is not to be taken as an admission that any of the material referred to was published, known or part of the common general knowledge at the priority date of any one of the claims.

SUMMARY

In an aspect, a rear view device for a vehicle includes: a rear view device head and a rear view device base; a detent system which is configured to control rotation of the rear view device head with respect to the rear view device base, the detent system comprising: a detent base with centre shaft attached to the rear view device base; a casing attached to the rear view device head and configured to rotate about the detent base with centre shaft; and a spring.

The rear view device may further include a thrust where movement of the thrust is configured to control movement of the spring.

The spring may be configured to control rotation of the casing.

In response to the spring bending, the casing may be configured to move.

The spring may include a friction surface and in response to the detent system being in a locked position, the friction surface may be contact with a surface of the detent base with centre shaft.

The spring may include a friction surface and in response to the detent system being in an unlocked position, the friction surface may be separated from a surface of the detent base with centre shaft.

The detent system may further include a clutch plate having friction material on opposite sides thereof.

The spring may be an elastic circular disc.

The spring may include a hole for receiving the detent base with centre shaft and at least one of one or more spring edge portions and one or more radial slits.

The rear view device may further include a detent subassembly, the detent subassembly including the spring, the thrust, one or more actuators, and a subassembly cover, where the spring is attached to the subassembly cover using one or more pins.

The detent system may further include one or more actuation mechanisms configured to move the thrust, each of the one or more actuation mechanisms including at least one of a shape memory alloy spring, a SMART material, a shape memory alloy wire, a piezo drive, an electro active polymer, an electromagnetic motor, and a DC motor.

The one or more actuation mechanisms may include at least two shape memory alloy springs positioned at spring receiving portions of the thrust.

In response to the actuation mechanism being activated in an unlocking operation, the actuation mechanism may move the thrust towards the spring, the thrust may bend the spring, the friction material of the spring may separate from the detent base with centre shaft, the detent system may be unlocked, and the casing can be rotated with respect to the detent base with centre shaft.

In response to the actuation mechanism being activated in a locking operation, the actuation mechanism may move the thrust away from the spring, the spring may return to its natural shape, the friction material of the spring may engage the detent base with centre shaft, the detent system may be locked, and the casing cannot be rotated with respect to the detent base with centre shaft except in response to a force which is greater than a force between the friction material and the detent base with centre shaft.

DESCRIPTION OF THE SEVERAL VIEWS OF THE DRAWINGS

The foregoing summary, as well as the following detailed description, will be better understood when read in conjunction with the appended drawings. For the purpose of illustration, certain embodiments of the present disclosure are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present invention and, together with the description, serve to explain advantages and principles consistent with the invention.

DETAILED DESCRIPTION

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Figure 1:
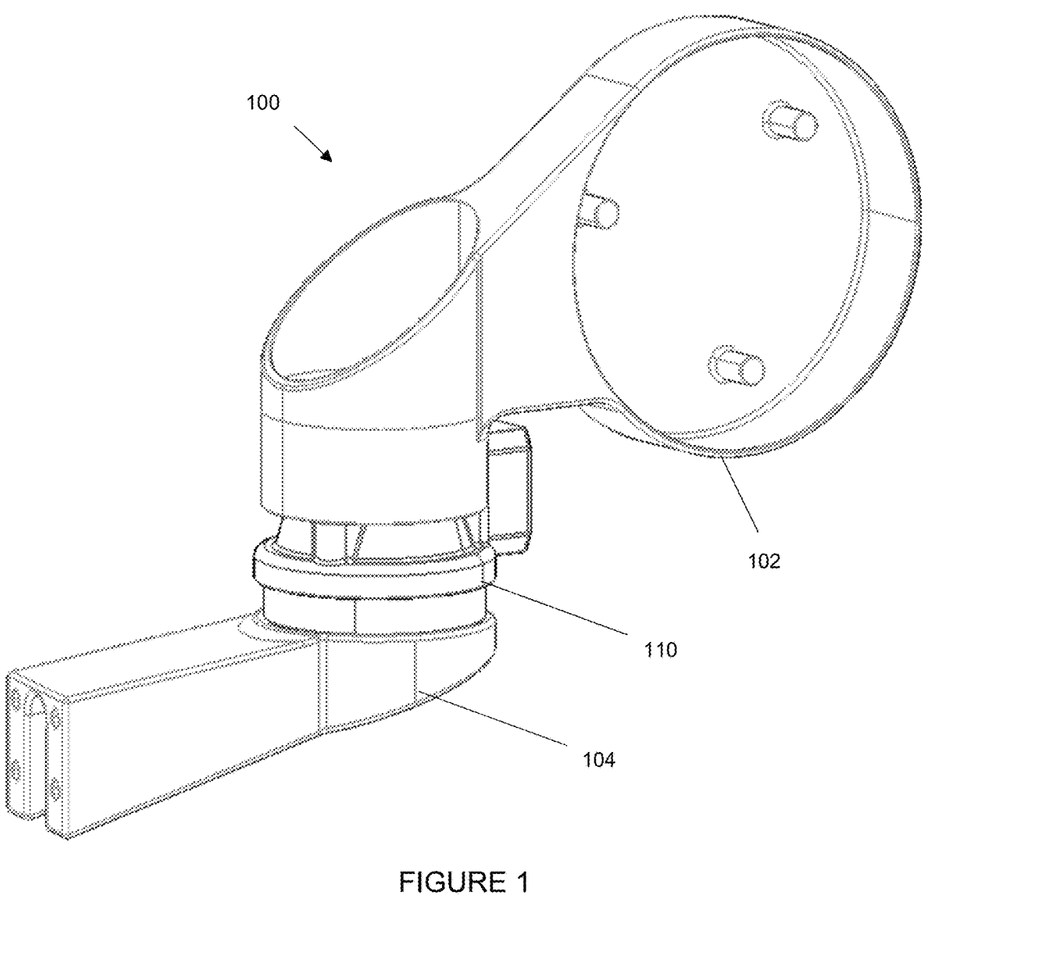
FIG. 1 is a diagram illustrating an example of a rear view device having a rear view device head and a rear view device base, the head being rotatable with respect to the base.

FIG. 1 is a diagram illustrating an example of a rear view device 100 having a rear view device head 102 and a rear view device base 104, the rear view device head 102 being rotatable with respect to the rear view device base 104. The rear view device 100 may include a rear view mirror, a rear view camera display system, or any other rear and/or side view display system. In this example, the rear view device head 102 includes a receiving portion for receiving a mirror (not shown) or includes a reflective element or display (not shown).

Figure 2:
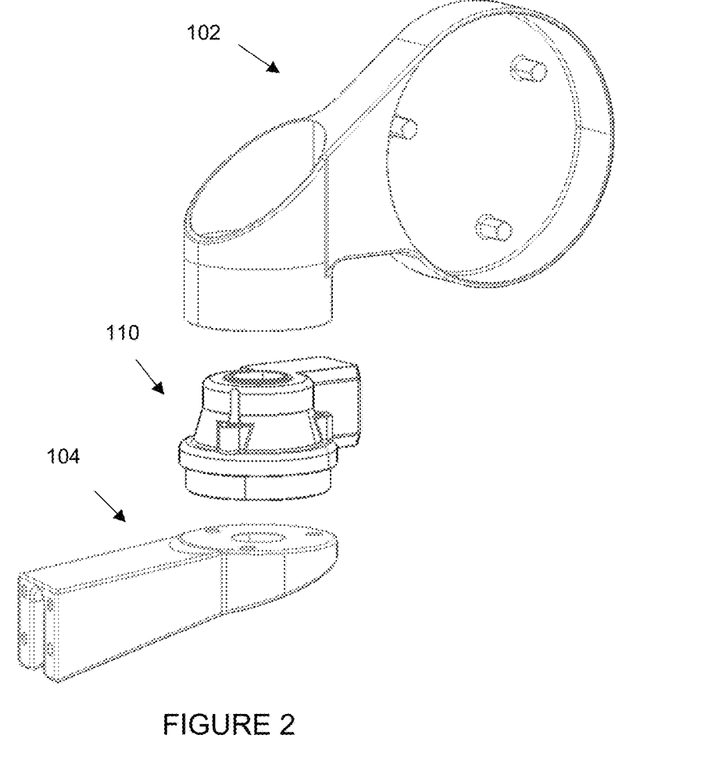
FIG. 2 is a diagram illustrating an example of the rear view device of FIG. 1 in an exploded configuration showing the rear view device head, the rear view device base, and a detent system between the head and the base.

FIG. 2 is a diagram illustrating an example of the rear view device 100 of FIG. 1 in an exploded configuration showing the rear view device head 102, the rear view device base 104, and a detent system 110 between the head 102 and the base 104. The detent system 110 connects the head 102 to the base 104, and in this example, rotatably connects the head 102 to the base 104. The detent system 110 is shown alone in FIG. 3 and described in more detail in connection with an exploded view as illustrated in FIG. 4.

Figure 3:
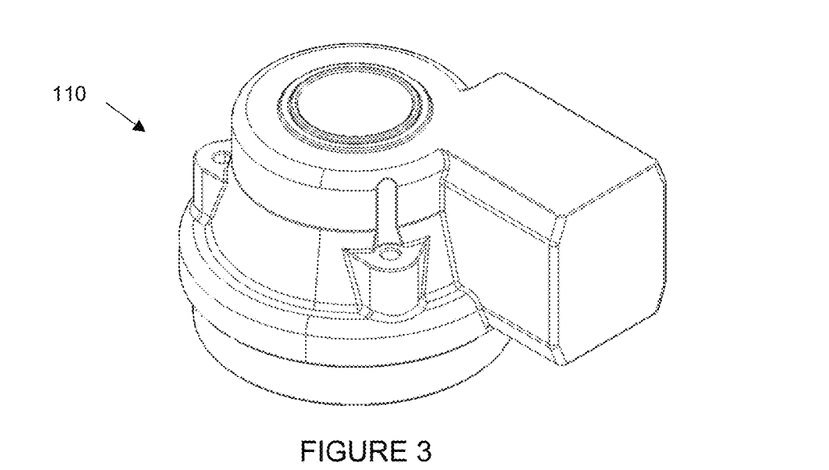
FIG. 3 is a diagram illustrating an example of the detent system of FIG. 2.
Figure 4:
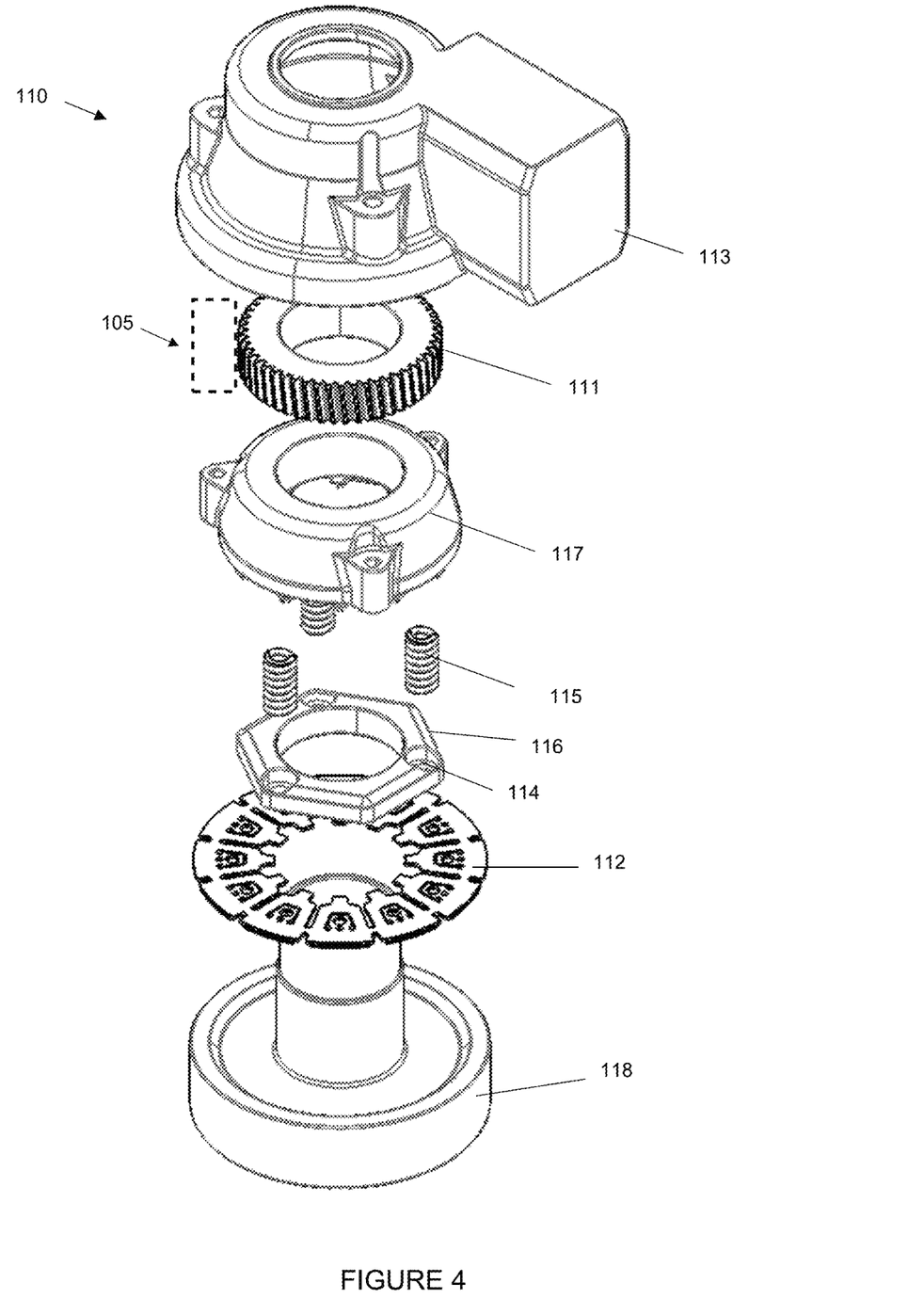
FIG. 4 is a diagram illustrating an example of the detent system of FIG. 2 in an exploded configuration.

FIG. 4 is a diagram illustrating an example of the detent system of FIGS. 2 and 3 in an exploded configuration.

Referring to the example of FIG. 4, the detent system 110 includes a casing 113 which is attached to the rear view device head 102, as shown in FIG. 2, and a detent base with centre shaft 118 which is attached to the rear view device base 104, as shown in FIG. 2. The casing 113 is configured to rotate with respect to and around the detent base with centre shaft 118. The detent system 110 further includes a gear wheel 111 as part of a drivetrain system (not shown), a subassembly cover 117, one or more springs such as shape memory alloy springs 115, a thrust 116 with one or more spring receiving portions 114, and a spring 112. While a diaphragm spring 112 is shown and described in this example, any spring 112 or a wire may also be used instead of the diaphragm spring 112 for all aspects of this application.

Figure 5:
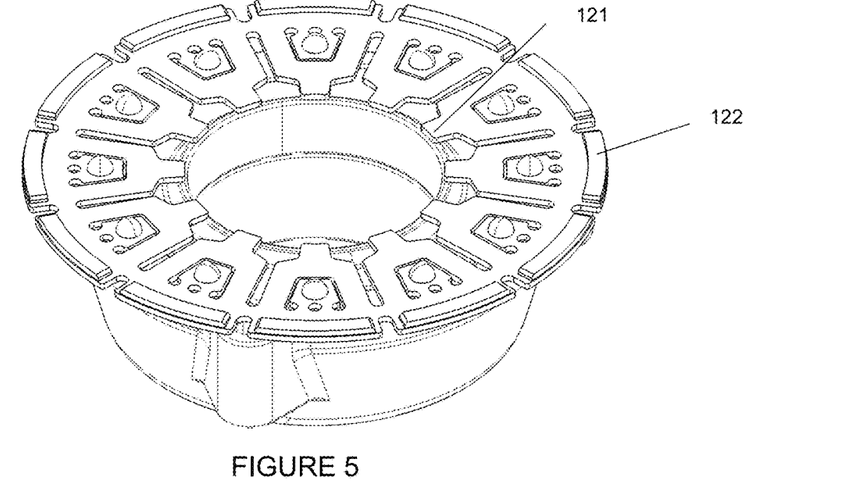
FIG. 5 is a diagram illustrating an example of the diaphragm subassembly of the detent system of FIGS. 3 and 4.
Figure 6:
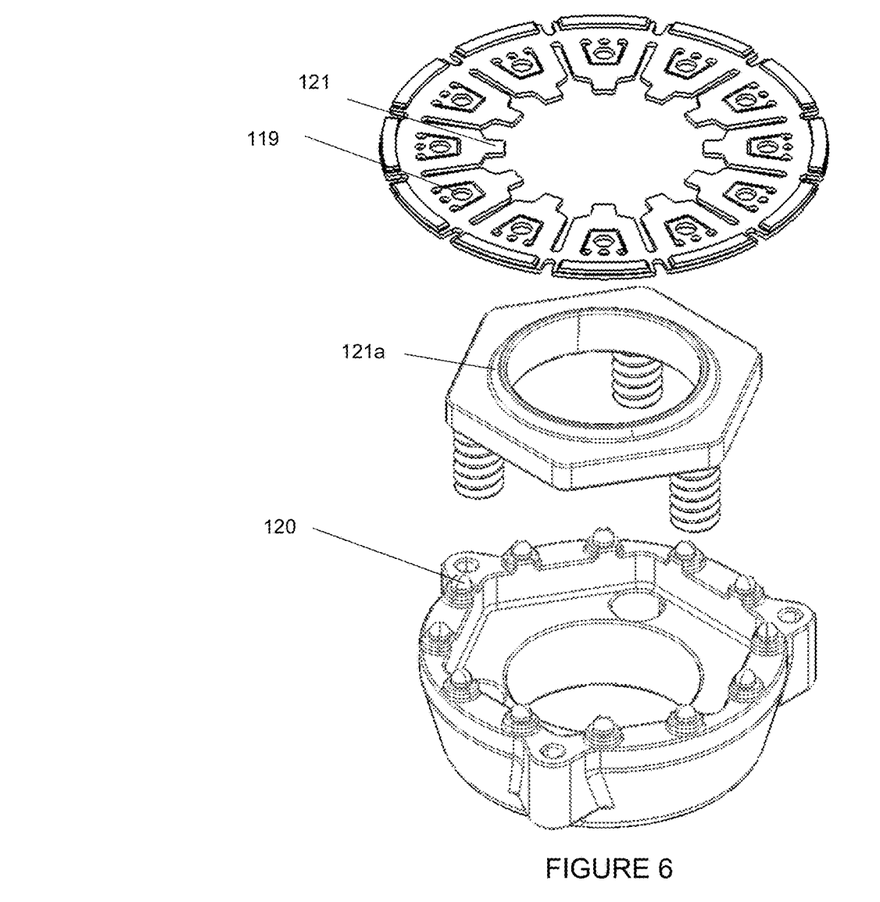
FIG. 6 is a diagram illustrating an example of the diaphragm subassembly of the detent system of FIGS. 3 and 4 in an exploded configuration.

A more detailed illustration of the subassembly, including the subassembly cover 117, the one or more springs 115, the thrust 116, and the diaphragm spring 112, is provided in FIGS. 5 and 6. Referring to FIGS. 5 and 6, the subassembly is shown in an opposite direction than the direction shown in FIG. 4. In FIGS. 5 and 6, the subassembly is shown from the side of the diaphragm spring 112 which will be in contact with the detent base with centre shaft 118. The diaphragm spring 112 includes spring edges 121 and friction material 122 formed on an outer circumference of the diaphragm spring 112. Here, the friction material 122 is formed intermittently about the outer circumference but it can be formed anywhere on the spring; for example, inwardly, in a straight line, continuously as one piece about the circumference, among other configurations. The spring edges 121 are formed inwardly as a plurality of projections but can also be formed in other configurations such as one or more inwardly projecting portions in multiple shapes, or outwardly projecting portions in a case where the friction material 122 is inwardly placed and the edges 121 are outwardly formed.

Referring now to FIG. 6, the subassembly is shown in an exploded view. The subassembly includes the diaphragm spring 112 which is configured to be placed on a corresponding receiving portion on the thrust 116. For example, the spring edges 121 may interact with or be placed on the rim 121a of the thrust 116. The thrust 116, and the springs 115 positioned therein, are positioned on and enclosed between the subassembly cover 117 and the diaphragm spring 112. The subassembly cover 117, in this example, includes one or more pins 120 which are snapped into pin receiving holes 119 of the diaphragm spring 112 to securely attach the diaphragm spring 112 and the subassembly cover 117 together.

Referring back to FIG. 4, the detent system 110 is configured to prevent or allow rotation of the rear view device head 102 with respect to the rear view device base 104. In particular, in response to the detent system 110 being deactivated or in a locked position, the rear view device head 102 only rotates with respect to the rear view device base 104 if the force applied to the head 102 is greater than the force between the friction material 122 of the diaphragm spring 120 and the detent base 118. In response to the detent system 110 being activated or in an unlocked position, the rear view device head 102 is capable of rotating freely with respect to the rear view device base 104.

Still referring to FIG. 4, the detent system 110 is activated or deactivated using shape memory alloy (SMA) springs 115. In this example, SMA springs 115 are used; however, it should be appreciated that the SMA springs 115 may be interchanged with any drive mechanism, such as SMART materials, SMA wires, piezo technology, electro active polymers, electromagnetic or DC motors, among other drive mechanisms. Once activated, the SMA springs 115 press down on the thrust 116 which presses down on the diaphragm spring 112. Referring to both FIGS. 4 and 6 together, the pushing down of the thrust rim 121a on the spring edges 121 causes the inner portion of the diaphragm spring 112 to be pushed down and the outer portion of the diaphragm spring 112 to be pushed up. This causes the friction material 122 to be lifted up from the detent base 118 at least partially or entirely. Because the friction material 122 is lifted from the detent base 118, the friction force caused thereby is reduced or eliminated, allowing the casing 113 to freely rotate about the detent base with centre shaft 118. Because the casing 113 is attached to the rear view device head 102 and the detent base with centre shaft 118 is attached to the rear view device base 104, the rear view device head 102 is capable of rotating freely with respect to the rear view device base 104.

Once deactivated, the SMA springs 115 retract to their original configuration and the thrust 116 moves up thus returning the diaphragm spring back to a substantially unbent or flat position which causes the friction material 122 to engage the detent base 118. In the deactivated position, the diaphragm spring 112 may be substantially flat, and may be flush with the surface of the detent base 118. In this position, the thrust 116 applies no force or minimal force to the face of the diaphragm spring 112.

In one example, the gear 111 is representative of the drivetrain, the remaining parts of the drivetrain (not shown) being assembled within the housing 113 and in constant engagement with the gear 111. Thus, the gear 111 may rotate within the housing 113 under the control of one or more actuator component(s) 105 such as a DC motor or a similar actuator 105, and may be coupled with further actuation mechanisms such as other gears or similar. The drivetrain transmits torque between the housing 113 and the shaft 118, thus the gear 111 may be affixed to the shaft 118 so that the housing 113 may rotate about the shaft 118.

In a preferred example, the drivetrain may be protected from the application of extra-large forces. That is, the gear 111 may be able to rotate under the influence of forces/torques above some predetermined threshold. A controlled slip of the gear 111 relative to the shaft 118 may be achieved using any of: (A) a tight fit, the gear 111 being installed onto the shaft 118 with an interference fit such as to create a controllable friction; (B) a clutch, some arrangement of mating surfaces held together under the influence of a separate force, such as from a spring; (C) a detent arrangement, specific engagements of sprung or otherwise flexible loaded features, that maintain orientation of the gear 111 onto the shaft 118 up to a breaking load; (D) magnetic alignment, an arrangement of magnetic poles that enact significant local attraction, thus resisting relocation up to the limit of their attraction; or many other example which may be appreciated by a person having ordinary skill in the art.

Referring to the preferred example, the gear 111 will remain static relative to the shaft 118 up to a "drive threshold torque", which is lower than the "clutch engaged torque" and higher than the "clutch disengaged torque". Thus, with the diaphragm spring 112 or clutch engaged, the diaphragm spring 112 or clutch will be dominant and will dictate the resistance to movement under impact. With the diaphragm spring 112 or clutch disengaged, the gear 111 will become dominant and will dictate the rotation of the rear view device 100 as linked to the remaining drivetrain.

Figure 7:
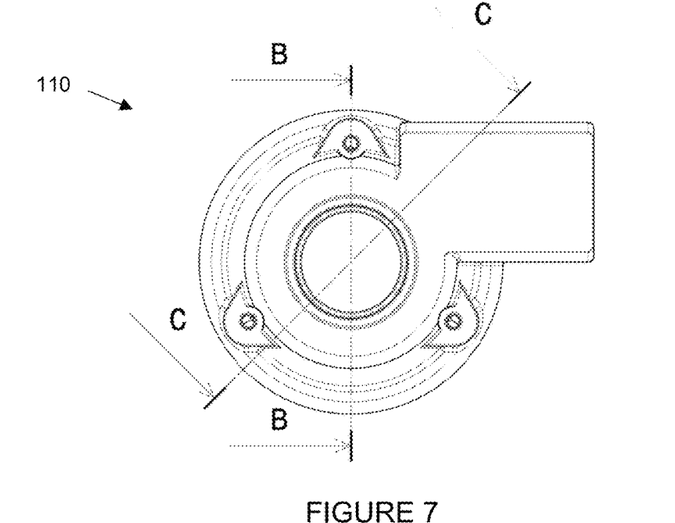
FIG. 7 is a diagram illustrating an example of the detent system of FIGS. 3 and 4 showing a cross section B-B and a cross section C-C
Figure 8A:
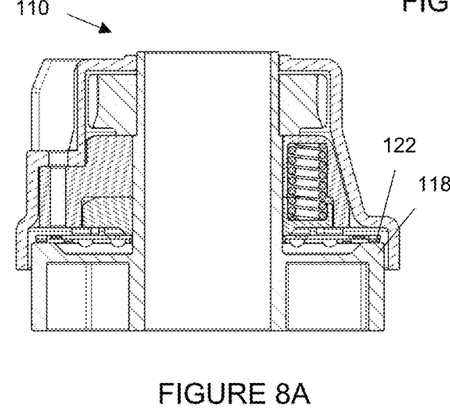
FIGS. 8A and 8B are diagrams illustrating the detent system in its deactivated, locked configuration along the cross-section B-B and the cross section C-C, respectively.
Figure 8B:
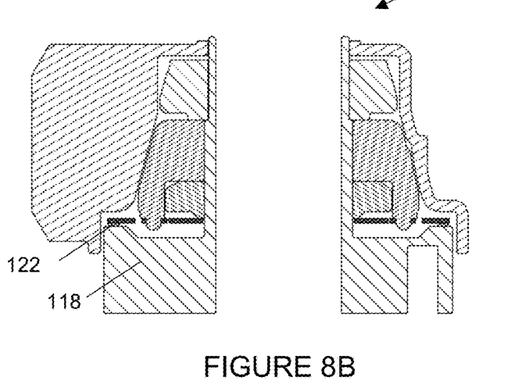
Figure 9A:
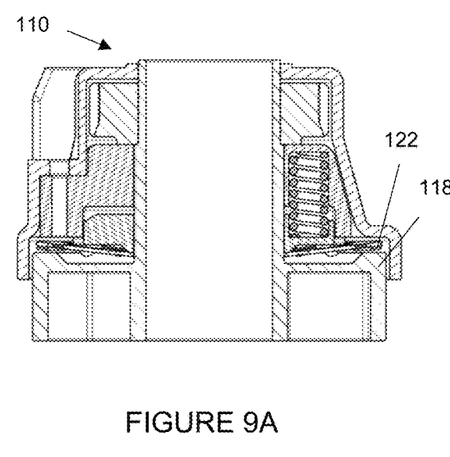
FIGS. 9A and 9B are diagrams illustrating the detent system in its activated, unlocked configuration along the cross-section B-B and the cross section C-C, respectively.
Figure 9B:
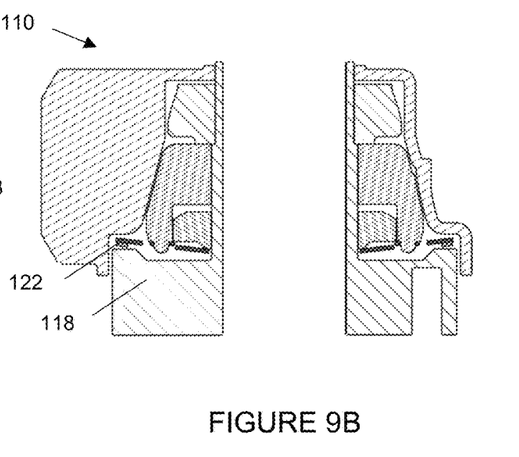

FIG. 7 is a diagram illustrating an example of the detent system of FIGS. 3 and 4 showing a cross section B-B and a cross section C-C. FIGS. 8A and 8B are diagrams illustrating the detent system in its deactivated, locked configuration along the cross-section B-B and the cross section C-C, respectively. FIGS. 9A and 9B are diagrams illustrating the detent system in its activated, unlocked configuration along the cross-section B-B and the cross section C-C, respectively.

Referring to FIGS. 8A and 8B, when the detent system 110 is in the deactivated, locked configuration, it can be seen that the friction material 122 is in contact with the detent base 118. Referring to FIGS. 9A and 9B, when the detent system 110 is in the activated, unlocked configuration, it can be seen that the diaphragm spring 112 is bent by the thrust 116, and the friction material 122 is lifted from the surface of the detent base 118. Accordingly, the casing 113 and attached rear view device head 102 can rotate with respect to the detent base 118 and attached rear view device base 104.

Figure 10:
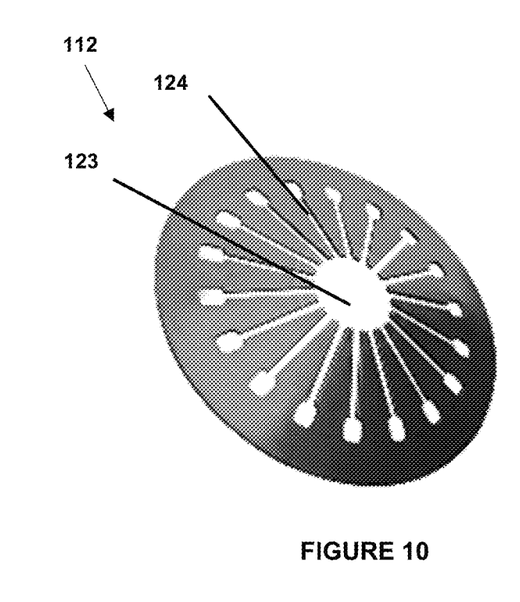
FIG. 10 is a diagram illustrating another example of a diaphragm spring which may be used with the detent system of the rear view device.

FIG. 10 is a diagram illustrating an example of another diaphragm spring 112 used with the detent system 110 of the rear view device 100. As illustrated in FIG. 10, the diaphragm spring 112 may include a centre hole 123 for receiving the centre shaft of the detent base with centre shaft 118, and may include one or more radially extending slits 124 for providing elasticity to the diaphragm spring 112. Other shapes and sizes for the diaphragm spring 112 and slits 124 may be envisioned by one of ordinary skill in the art.

Figure 11:
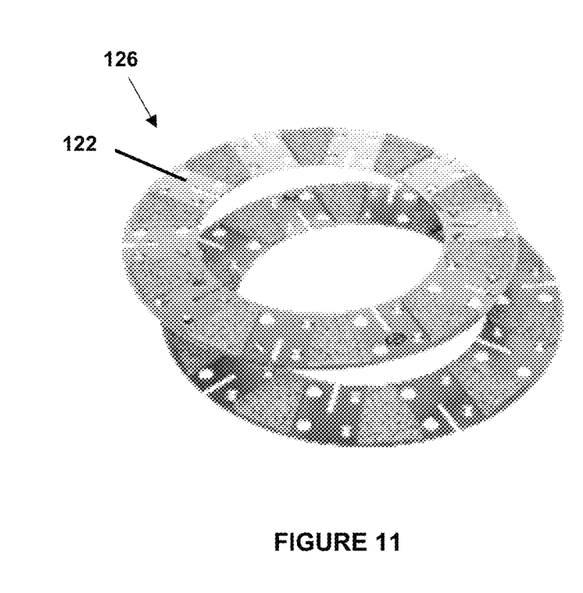
FIG. 11 is a diagram illustrating an example of a clutch plate which may be used with the detent system of the rear view device.

FIG. 11 is a diagram illustrating an example of a clutch plate 114 that may be with the detent system 110 of the rear view device 100. Referring to FIG. 11, to increase the interaction forces in the system, a clutch plate 126 may be incorporated between the surfaces of the diaphragm spring 112 and the detent base 118. As provided above in the description, to increase the interaction forces in the system, the clutch plate 114 may be incorporated between the surfaces of the spring 112 and the detent base 118 with additional friction material 122 applied to both faces of the clutch plate 114. Throughout the specification, friction material 122 may also refer to friction pads having friction material 122 applied on their surface. An alternative to friction pads, is a texture applied to a surface by a method such as sand blasting or etching, or any other formed surface which is capable of providing a friction force.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

REFERENCE LIST

100 rear view device
102 rear view device head
104 rear view device base
110 detent system
111 gear wheel
112 diaphragm spring
113 casing
114 spring receiving portion
115 shape memory alloy springs
116 thrust
117 subassembly cover
118 detent base with centre shaft
119 pin receiving holes
120 pins
121 spring edge portions
121a thrust rim
122 friction material
123 centre hole
124 extending slits
126 clutch plate

What is claimed is:

1. A rear view device for a vehicle, comprising:
a rear view device head;
a rear view device base;
a detent system which is configured to control rotation of the rear view device head with respect to the rear view device base, the detent system comprising:
a detent base with a centre shaft attached to the rear view device base;
a casing attached to the rear view device head and configured to rotate about the detent base with the centre shaft; and
a spring; and
a detent subassembly, the detent subassembly comprising:
the spring;
a thrust;
one or more actuators; and
a subassembly cover,
wherein the spring is attached to the subassembly cover using one or more pins.

2. The rear view device of claim 1, wherein movement of the thrust is configured to control movement of the spring.

3. The rear view device of claim 1, wherein the spring is configured to control rotation of the casing.

4. The rear view device of claim 1, wherein, in response to the spring bending, the casing is configured to move.

5. The rear view device of claim 1, wherein the spring comprises a friction surface and in response to the detent system being in a locked position, the friction surface is in contact with a surface of the detent base with the centre shaft.

6. The rear view device of claim 1, wherein the spring comprises a friction surface and in response to the detent system being in an unlocked position, the friction surface is separated from a surface of the detent base with the centre shaft.

7. The rear view device of claim 1, wherein the detent system further comprises a clutch plate comprising friction material on opposite sides thereof.

8. The rear view device of claim 1, wherein the spring is an elastic circular disc.

9. The rear view device of claim 1, wherein the spring comprises a hole for receiving the detent base with the centre shaft and at least one of one or more spring edge portions and one or more radial slits.

10. The rear view device of claim 1, wherein the detent system further comprises one or more actuation mechanisms configured to move the thrust, each of the one or more actuation mechanisms comprising at least one of at least one shape memory alloy spring, a shape memory alloy wire, a piezo drive, an electro active polymer, an electromagnetic motor, and a DC motor.

11. The rear view device of claim 10, wherein the at least one shape memory alloy spring is comprised of at least two shape memory alloy springs positioned at spring receiving portions of the thrust.

12. The rear view device of claim 10, wherein, in response to the one or more actuation mechanisms being activated in an unlocking operation, the one or more actuation mechanisms moves the thrust towards the spring, the thrust bends the spring, a friction material of the spring separates from the detent base with the centre shaft, the detent system is unlocked, and the casing can be rotated with respect to the detent base with the centre shaft.

13. The rear view device of claim 10, wherein, in response to the one or more actuation mechanisms being activated in a locking operation, the one or more actuation mechanisms moves the thrust away from the spring, the spring returns to its at rest shape, a friction material of the spring engages the detent base with the centre shaft, the detent system is locked, and the casing cannot be rotated with respect to the detent base with the centre shaft except in response to a force which is greater than a force between the friction material and the detent base with the centre shaft.

14. A rear view device for a vehicle, comprising:
a rear view device head;
a rear view device base; and
a detent system which is configured to control rotation of the rear view device head with respect to the rear view device base, the detent system comprising:
   a detent base with a centre shaft attached to the rear view device base;
   a casing attached to the rear view device head and configured to rotate about the detent base with the centre shaft; and
   a spring, wherein the spring is a diaphragm spring, which includes spring edges and frictional material formed on an outer circumference of the diaphragm spring,
wherein, in response to the detent system being in a deactivated, locked configuration, the frictional material is in contact with the detent base, and, in response to the detent system being in an activated, unlocked configuration, the diaphragm spring is bent by a thrust, and the frictional material is lifted from the surface of the detent base.

15. A rear view device for a vehicle, comprising:
a rear view device head;
a rear view device base;
a detent system which is configured to control rotation of the rear view device head with respect to the rear view device base, the detent system comprising:
   a detent base with a centre shaft attached to the rear view device base;
   a casing attached to the rear view device head and configured to rotate about the detent base with the centre shaft; and
   a spring,
wherein the detent system further comprises one or more actuation mechanisms configured to move a thrust, each of the one or more actuation mechanisms comprising at least one of at least one shape memory alloy spring, a shape memory alloy wire, a piezo drive, an electro active polymer, an electromagnetic motor, and a DC motor, and
wherein the at least one shape memory alloy spring is comprised of at least two shape memory alloy springs positioned at spring receiving portions of the thrust.

16. A rear view device for a vehicle, comprising:
a rear view device head;
a rear view device base;
a detent system which is configured to control rotation of the rear view device head with respect to the rear view device base, the detent system comprising:
   a detent base with a centre shaft attached to the rear view device base;
   a casing attached to the rear view device head and configured to rotate about the detent base with the centre shaft; and
   a spring,
wherein the detent system further comprises one or more actuation mechanisms configured to move a thrust, each of the one or more actuation mechanisms comprising at least one of a shape memory alloy spring, a shape memory alloy wire, a piezo drive, an electro active polymer, an electromagnetic motor, and a DC motor, and
wherein, in response to the one or more actuation mechanisms being activated in an unlocking operation, the one or more actuation mechanisms moves the thrust towards the spring, the thrust bends the spring, a friction material of the spring separates from the detent base with the centre shaft, the detent system is unlocked, and the casing can be rotated with respect to the detent base with the centre shaft.

17. A rear view device for a vehicle, comprising:
a rear view device head;
a rear view device base;
a detent system which is configured to control rotation of the rear view device head with respect to the rear view device base, the detent system comprising:
   a detent base with a centre shaft attached to the rear view device base;
   a casing attached to the rear view device head and configured to rotate about the detent base with the centre shaft; and
   a spring,
wherein the detent system further comprises one or more actuation mechanisms configured to move a thrust, each of the one or more actuation mechanisms comprising at least one of a shape memory alloy spring, a shape memory alloy wire, a piezo drive, an electro active polymer, an electromagnetic motor, and a DC motor, and
wherein, in response to the one or more actuation mechanisms being activated in a locking operation, the one or more actuation mechanisms moves the thrust away from the spring, the spring returns to its at rest shape, a friction material of the spring engages the detent base with the centre shaft, the detent system is locked, and the casing cannot be rotated with respect to the detent base with the centre shaft except in response to a force which is greater than a force between the friction material and the detent base with the centre shaft.

* * * * *